3,184,887
PROCESS OF PRODUCING GLYCOSIDES FROM LIVING PLANTS
Arrien G. Winter, deceased, late of Bonn, Germany, by Ilse Winter, heir, Bonn, Germany, assignor to Dr. Madaus & Co. Kommanditgesellschaft, Cologne-Merheim, Germany, a corporation of Germany
No Drawing. Filed Mar. 14, 1961, Ser. No. 101,617
Claims priority, application Germany, Mar. 14, 1960, M 44,664
8 Claims. (Cl. 47—1.2)

The present invention relates to a process for the formation of metabolized glycosides from living plants and more particularly to a process of promoting the formation of metabolized glycosides from living plants and of enriching such plants with such substances, and to a process of isolating such substances from such plants.

It is known that cut plants and parts of plants are capable of absorbing and taking up organic substances and of fermentatively modifying and changing such absorbed organic substances. Investigations of this kind have been carried out, for instance, for the purpose of examining the manner in which intermediates and precursors which are assumed to be required, are converted into alkaloids, or, respectively, of determining generally the fermentative power of flowering plants. Such biosynthetic processes and methods, however, are not adapted for industrial use and large scale operation because due to the lack in additional growth of the cut plants and their parts and to a number of other reasons the yield will be too small and the process too expensive.

One object of the present invention consists in providing a process of forming glycosides in plants by absorbing the corresponding aglucones from liquid nutrient media.

Another object of the present invention consists in providing a process of producing glycosides by biosynthesis in plants growing on a liquid culture medium containing the corresponding aglucones and of isolating such biosynthetically produced glycosides from said liquid culture media.

Other objects of the present invention and advantageous features thereof will become apparent as the description proceeds.

In principle, the present invention consists in supplying to living plants through their nutrient medium glycosidizable organic compounds which, ordinarily, are not present in and/or formed by such plants and in recovering from such plants the glycosides of said organic compounds and/or conversion products thereof as they are produced by the vital functions of the plants, i.e., by biosynthesis within the plants. The vital functions, thereby, have a catalytic effect.

For instance, the process according to the present invention permits absorption of many different glycosidizable compounds by living plants such as wheat, beans, especially *Phaseolus vulgaris,* water-cress (*Nasturtium officinale*), and others via the roots from nutrient solutions. The absorbed glycosidizable compounds may be converted in the living plant by its fermentative functions into commercially important, preferably into therapeutically effective glycosides which are recovered from the plant. The plant thus serves, so to speak, as reaction container as well as provides the reactants to cause such conversions.

According to the present invention plants are preferably cultivated and grown in liquid nutrient solutions, also called water cultures or hydroponics, which contain the respective glycosidizable compound. The roots absorb the glycosidizable compound and introduce the same in considerable amounts into the growing plant. Numerous glycosidizable compounds can be introduced into plants by proceeding in this manner. Solely the molecular weight of the respective glycosidizable compound and other factors determining the permeability of the respective compound limit the absorbability of said compound by the roots. In general, compounds having a molecular weight up to about 800 are comparatively readily absorbed by the roots. The lipid solubility of the compound is also of importance with respect to its absorption.

The absorbed compounds are reacted and converted in many different ways depending upon the type and properties of the compound, the kind of plant used for absorption, and the fermentative system in the plant. The conversion products can be recovered from the roots as well as from aboveground parts of the plants which can be grown on a large scale and with large yields. Frequently the conversion products recovered from the roots differ from those obtained from aboveground shoots, sprouts, and other parts of the plants. This is due to the different fermentative systems present in said organs.

Thus it is possible to supply compounds contained in and/or produced by plants or plant genera, families, or the like, or even synthetic compounds, and also compounds which are not obtained in the normal metabolism of specific plants, for fermentative alteration or conversion into glycosides by way of the roots to various and different plants. Such compounds then participate in the metabolism of the respective plant and/or are exposed to the action of ferments in the living plant with which, ordinarily, they do not come into contact in nature. As a result thereof biosynthetic process take place for which the necessary conditions are not provided by nature. Thus cultivation of the plants in liquid nutrient media or hydroponics according to the present invention renders possible the recovery and production of such metabolic glycosides in a satisfactory yield.

It is a preferred embodiment of the present invention to incorporate into the plant organic compounds which can be converted into glucosides, and to cause glucosidation by the fermentative system of the plant.

The following examples serve to illustrate the present invention without, however, limiting the same thereto.

EXAMPLE 1

Formation of phlorin by supplying phloroglucinol to wheat plants.

Young wheat seedlings are grown in a suitable liquid nutrient medium containing 300γ of phloroglucinol per cc. Formation of phlorin in the plant can be detected after 2 hours. The amount of phlorin increases when cultivation of the seedlings in the phloroglucinol-containing nutrient medium is continued, to about 5% of the dry weight of the plant. Phlorin can be recovered from the roots as well as from the aboveground parts of the plant. However, phlorin deposition in the aboveground organs sets in only when using phloroglucinol concentrations in the nutrient liquid which exceeds about 400 γ/cc.

The process thus permits conversion of phloroglucinol into its monoglucoside phlorin by simply growing wheat seedlings on a liquid culture medium containing phloroglucinol, drying the resulting plants as soon as the phlorin content is about 5%, and recovering phlorin from the dried plant material, for instance, by extraction with a suitable solvent. No chemical reagents are required for the glucosidation of phloroglucinol.

EXAMPLE 2

Bean plants are cultivated in a suitable liquid nutrient medium containing 200 γ of hydroquinone per cc. The roots absorb the hydroquinone. After 5 minutes, formation of arbutin can be detected in the roots. Said arbutin formation increases with continued cultivation. After 24 hours, 3% to 5% of the dry weight of the roots consist of arbutin.

When increasing the hydroquinone concentration in the nutrient medium to about 300 γ/cc., arbutin formation and deposition in the shoots sets in.

Other plants which are more resistant to hydroqinone permit the production of even larger amounts of arbutin in the dried plant material.

By extracting the dried plant material with water or alcohol, abutin is recovered.

When continuing growing the plants in the hydroquinone-containing nutrient medium, part of the arbutin is excreted into said medium and can be recovered therefrom. This modification of the process according to the present invention considerably facilitates purification of the arbutin isolated from the nutrient liquid because the extracts contain smaller amounts of other substances than extracts obtained from roots.

Arbutin excretion into the nutrient solution is observed when growing wheat or bean plants in nutrient solutions containing 20 γ/cc. of hydroquinone. Arbutin excretion is detected in such solutions after about 120 hours provided the hydroquinone solution is daily replaced by a freshly prepared solution. When growing wheat or bean plants in nutrient solutions containing 200 γ/cc. of hydroquinone, the presence of arbutin can be demonstrated after cultivation for about 4 hours.

It is evident that, while hydroquinone is absorbed and arbutin is synthesized by the plant, arbutin is excreted simultaneously by the plant. When replacing the hydroquinone-containing nutrient solution by a hydroquinone-free nutrient solution, arbutin is also excreted and found therein.

Excretion of arbutin ceases about 4 hours after growing the plants in the hydroquinone-free nutrient solution. The remaining arbutin content of the roots does not appreciably decrease on further cultivation in the hydroquinone-free nutrient solution. When again placing and growing the plants in a hydroquinone-containing nutrient solution, arbutin excretion into the solution starts again. Thus two components of the glycoside arbutin in the root can be distinguished, namely the arbutin which is excreted into the nutrient solution and the arbutin which is retained by the roots.

When continuously supplying the plants with hydroquinone and continuously removing arbutin from the nutrient solution, a cyclic process of producing arbutin is established which consists in the following phases:

Hydroquinone in the nutrient solution→
hydroquinone absorption by and arbutin formation in the roots→
arbutin excretion into the nutrient medium→
recovery of arbutin from the nutrient medium→
hydroquinone in the nutrient solution.

EXAMPLE 3

Young wheat plants are grown in a suitable liquid nutrient medium to which 500 γ/cc. of esculetin (6,7-dihydroxy coumarin) have been added. Part of the esculetin remains insoluble in water. However, it is gradually dissolved at the rate at which esculetin is absorbed by the roots of the wheat plants. The absorbed esculetin is glucosidized in the plant to esculin, i.e., the 6-monoglucoside of esculetin. Cultivation is continued until the roots contain about 2% of esculin in the dried material. The esculin is found only in the roots and not in the shoots.

EXAMPLE 4

Wheat or bean plants are grown in a suitable liquid nutrient medium containing 1000 γ/cc. of umbelliferone (7-hydroxy coumarin). Part of the umbelliferone remains undissolved and is gradually dissolved at the rate at which umbelliferone is absorbed by the plants. The absorbed umbelliferone is converted by the plant into skimmin, i.e., umbelliferone-7-glucoside. Cultivation is continued until the roots contain up to 3% of their dry weight of skimmin. In the wheat sprouts there is observed another compound which heretofore has not been found in wheat. This compound has an Rf-value different from that of skimmin. (Rf-value is a term from paper chromatography and equals the distance travelled by the front of the material in question divided by the distance travelled by the solvent front. See, for instance, Fieser and Fieser, "Organic Chemistry," Third Edition, Reinhold Publishing Corporation, New York, 1956, page 428, third paragraph.) It shows fluorescence under the ultraviolet lamp on exposure to ammonia vapors.

EXAMPLE 5

When adding not only umbelliferone in an amount of 500 γ/cc. but also galactose in an amount of 1000 γ/cc. to the nutrient solution and growing wheat plants on such a nutrient medium, not only skimmin is produced but also the 7-galactoside of umbelliferone indicating that glycosidation with other carbohydrates than glucose can take place.

Addition of other carbohydrates to the nutrient solution causes formation of other umbelliferone glycosides which can be recovered by extraction with suitable solvents from the dried plant material and especially the roots.

Hydroquinone, phloroglucinol, and esculetin may also be converted by the plants into glucosides with other carbohydrates although such glycosidation does not proceed as readily as with umbelliferone.

A large number of other glycosidizable compounds can also be absorbed from nutrient solutions containing the same and are converted by the fermentative processes in the plants into valuable conversion products. For instance, 6 days old wheat seedlings are grown in liquid nutrient media containing between about 50γ/cc. and about 100γ/cc. of pyrocatechol, and resorcinol. After cultivation for 2 hours to 48 hours, the roots are thoroughly rinsed, comminuted, extracted with methanol, and the extracts are subjected to paper chromatography. In this manner it was found by comparing such extracts with the pure starting compounds and extracts from untreated plants by means of color reactions and by determining Rf-values, that the compounds supplied by means of the nutrient solution have been absorbed therefrom and are converted by the plants into glycosides as has been established by elution of the paper chromatogram and hydrolysis of the eluate by means of hydrochloric acid. The following table shows which of these compounds were converted into new compounds, especially into compounds of glycosidic structure.

Table

| Example No. | Compound supplied to the nutrient liquid | Compounds found in the plant | |
| --- | --- | --- | --- |
| | | In unchanged condition | As new compounds |
| 6 | Pyrocatechol | | Glucoside. |
| 7 | Resorcinol | + | Do. |
| 8 | Phloroglucinol | | Glucoside (phlorin). |

Other compounds which are absorbed by the roots of plants cultivated on liquid nutrient media containing the same are, for instance, steroid compounds which are present in plants in the forms of their glycosides such as the digitalis genines and other steroid compounds.

It is evident that the chemical composition of a plant can be varied by causing it to absorb glycosidizable compounds from the nutrient medium and/or by converting such compounds into different metabolized glycosides. The process of the present invention thus permits to utilize living plants as host for various glycosidizable compounds which are either absorbed as such from the nutrient medium or are produced by the vital functions of the plant from such absorbed compounds.

Other plants than wheat and beans and especially all plants which are capable of large scale cultivation such as other kinds of grain, corn, potatoes, clover, peas, fodder bean (*Vicia faba*), carrots, melilot (*Melilotus alba*), and others, may also be used for the purpose of the present invention and other compounds than those mentioned may be added to the nutrient solutions. Likewise, many changes and variations in the nutrient solutions, the amounts of compounds added thereto, the duration of growth and cultivation, the methods of isolating and recovering the absorbed and/or converted compounds from the plant material, and the like may be made by those skilled in the art in accordance with the principles set forth herein and in the claims annexed hereto.

What is claimed is:

1. The process of producing a metabolized glycoside from a living plant which comprises cultivating said plant on a nutrient medium containing a glycosidizable compound and a carbohydrate capable of inducing said plant to form said glycoside, and isolating said metabolized glycoside from said cultivated plant.

2. The process according to claim 1, wherein the nutrient medium is a liquid nutrient medium.

3. The process according to claim 1, wherein said plant is selected from the group consisting of beans, grains, water cress, corn, potatoes, clover, carrots, peas, and melilot.

4. The process of producing a metabolized glycoside from a living plant which comprises cultivating said plant on a nutrient medium containing a glycosidizable compound of the group consisting of hydroquinone, phloroglucinol, esculetin, and umbelliferone, and isolating said metabolized glycoside from said cultivated plant.

5. The process of producing arbutin from a living plant, which process comprises cultivating said plant on a nutrient medium containing hydroquinone and isolating arbutin from said cultivated plant.

6. The process of producing phlorin from a living plant, which process comprises cultivating said plant on a nutrient medium containing phloroglucinol and isolating phlorin from said cultivated plant.

7. The process of producing esculin from a living plant, which process comprises cultivating said plant on a nutrient medium containing esculetin and isolating esculin from said cultivated plant.

8. The process of producing skimmin from a living plant, which process comprises cultivating said plant on a nutrient medium containing umbelliferone and isolating skimmin from said cultivated plant.

References Cited in the file of this patent

UNITED STATES PATENTS 2,971,292   Malecki _____ Feb. 14, 1961

FOREIGN PATENTS 693,723   France _____ Sept. 2, 1930
449,468   Great Britain _____ June 19, 1936

OTHER REFERENCES

Ser. No. 261,049, Lande (A.P.C.), published May 11, 1943. (The application was abandoned.)

Ellis, C., et al., Soilless Growth of Plants, second ed., N.Y., Rheinhold, 1947, pages 42, 43, 134 through 139, 201–206, 207, 225, 229. SB 139. E5 (1947).